United States Patent [19]

Sygnator

[11] Patent Number: 4,749,322
[45] Date of Patent: Jun. 7, 1988

[54] ALUMINUM ROOF PANEL FASTENER

[75] Inventor: Henry A. Sygnator, Arlington Heights, Ill.

[73] Assignee: Illinois Tool Works Inc., Chicago, Ill.

[21] Appl. No.: 933,853

[22] Filed: Nov. 24, 1986

[51] Int. Cl.$^4$ .................. F16B 25/00; F16B 43/00
[52] U.S. Cl. ........................................ 411/387; 411/533
[58] Field of Search .............. 411/387, 533, 368–370, 411/542, 386, 399, 187

[56] References Cited

U.S. PATENT DOCUMENTS

| | | | |
|---|---|---|---|
| 1,251,676 | 1/1918 | McCaffray | 411/368 |
| 3,661,046 | 5/1972 | Waud et al. | 411/369 |
| 3,993,397 | 11/1976 | Gutshall | 411/533 X |
| 4,235,147 | 11/1980 | Weidner | 411/542 X |
| 4,292,007 | 9/1981 | Wagner | 411/533 X |
| 4,312,616 | 1/1982 | Waller et al. | 411/387 |
| 4,435,112 | 3/1984 | Becker | 411/368 |
| 4,589,809 | 5/1986 | Moore et al. | 411/533 X |
| 4,615,655 | 10/1986 | Dixon | 411/533 X |

FOREIGN PATENT DOCUMENTS

2159745 12/1985 United Kingdom ............... 411/387

Primary Examiner—Lloyd A. Gall
Attorney, Agent, or Firm—David I. Roche; Thomas W. Buckman

[57] ABSTRACT

A threaded fastener unit comprising a preassembled fastener for use in association with thin metal panels having a head with a clamping surface thereunder, a shank and a drill point, said shank having an upper unthreaded shank portion, a lower threaded shank portion with an annular shoulder therebetween and a washer, said threaded shank portion having a plurality of helical thread convolutions for forming complementary threads and extruding a portion of a panel, and said shoulder being adapted to deform the extruded panel portion for gripping the screw and resisting retrograde rotation of the screw.

3 Claims, 1 Drawing Sheet

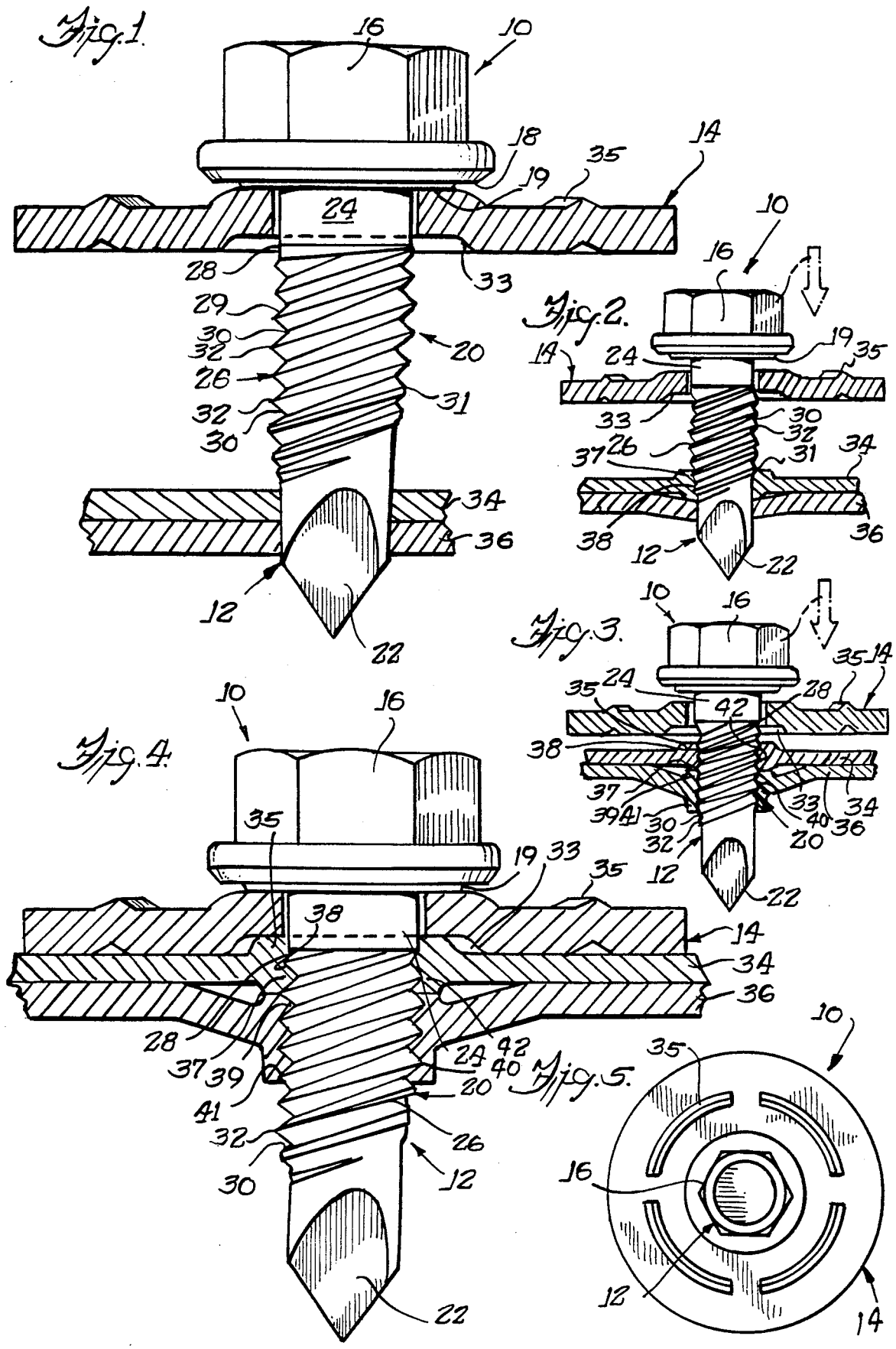

ALUMINUM ROOF PANEL FASTENER

BACKGROUND OF THE INVENTION

This invention relates to a threaded fastener and washer assembly and more particularly to a preassembled threaded fastener and washer assembly for use in connection with aluminum panel roof construction.

There have been many attempts to provide a threaded fastener and washer assembly suitable for securing relatively thin metal panels or workpieces together. Securely fastening two such thin metal workpieces together has been difficult due to the tendency of the threaded fastener to strip the associated panels under relatively high torque. The sealing characteristics of such fasteners were also deficient due to the inability to manufacture a screw which has a thread immediately beneath the clamping surface of the head of the screw.

Many attempts have been made to provide a sheet metal fastener assembly that effectively forms tight waterproof joints. For example the invention of prior art U.S. Pat. No. 3,661,046 utilized a combination of a threaded fastener with an upper threaded portion and a compressible sealing washer which provided an effective seal in sheet metal environments. However, the joint between sheet metal panels for metal roof or building construction must be extremely tight to withstand environmental factors. While the above noted prior art threaded fastener has met with a certain amount of success, total effectiveness and efficiency of such fasteners can still be greatly improved.

Accordingly, it is an object of the present invention to provide an improved preassembled threaded fastener unit for use in metal roof or building construction which will effectively and tightly join sections of relatively thin sheet metal panels without stripping the panels.

It is a further object of this invention to provide a preassembled threaded fastener unit which will effectively join sheet metal panels and provide a protective weatherproof seal.

SUMMARY OF THE INVENTION

This invention contemplates a preassembled fastener unit for use in metal roof construction comprising a fastener and a compressible sealing washer. The fastener includes a head with a clamping surface thereunder, a shank portion and a drill point. The shank portion of the fastener includes an unthreaded shank portion with an axial extent greater than the axial extent of the washer, a threaded shank portion and an annular shoulder placed a predetermined distance below said clamping surface and located between said unthreaded shank portion and threaded shank portion. The diameter of said annular shoulder is less than the inner diameter of the washer for holding the washer in assembled relationship with the fastener. The threaded shank portion includes a plurality of helical thread convolutions defining spaced crests and roots. The crest diameter is greater than the internal diameter of the washer. In operation the fastener unit is drilled into upper and lower metal panels deforming the panels in an axial direction forming spaced crests and roots in the panels, and the annular shoulder partially displaces the uppermost thread extrusion in the upper workpiece for effectively locking the fastener against retrograde rotation.

DETAILED DESCRIPTION OF THE ILLUSTRATED EMBODIMENT

The features of the present invention which are believed to be novel are set forth with particularlity in the appended claims. The organization and manner of operation of the invention, together with further objects and advantages thereof, may best be understood by reference to the following description taken in connection with the accompanying drawings in which like reference numerals identify like elements, and in which:

FIG. 1 is a side elevational view, partially in cross-section, of the threaded fastener unit constructed in accordance with the present invention, showing a pilot region of the fastener after it has entered the workpiece material;

FIG. 2 is a side elevational view, partially in cross-section, of the threaded fastener unit showing the upper workpiece being extruded by action of a thread-forming portion of the screw;

FIG. 3 is a side elevational view, partially in cross-section, of the threaded fastener unit showing both the upper and lower workpieces being extruded by the screw;

FIG. 4 is a side elevational view of the threaded fastener similar to FIG. 1, but showing the unit in its final operational state when utilized in conjunction with an upper and lower workpiece; and FIG. 5 is a top plan view of the threaded fastener unit.

DETAILED DESCRITPION OF THE INVENTION

Turning now to the drawings wherein similar parts bear similar numerals, in FIGS. 1-5 there is a shown a fastener unit 10 comprising a preformed threaded fastener 12 and a compressible washer 14.

As shown best in FIG. 1, the threaded fastener 12 comprises a head 16 having a clamping surface 18 and an anti-compression ring 19 thereunder, a shank 20 and drill point or pilot region 22. The shank 20 includes an upper unthreaded shank portion 24 located beneath the clamping surface 18, a lower threaded shank portion 26, and an annular shoulder 28 facing the drill point and located a predetermined distance below the head 16 and between the unthreaded shank portion 24 and threaded shank portion 26 for the purpose described below. The threaded shank portion 26 is provided with a plurality of helical thread convolutions 29 having spaced apart roots 30 and crests 32. One or more of the thread convolutions adjacent the drill point 22 are tapered and provided with progressively flattened crests 31 for functioning as complementary thread forming or extruding means when the screw is driven into a workpiece as described below.

As shown in FIGS. 1-5, the washer includes raised ribs 35. The washer 14 also has an internal annular offset portion defining a recess 33 as best shown in FIGS. 1-4.

The axial extent of the unthreaded shank portion 24 is greater than the thickness of the washer 14 so that a portion of the unthreaded shank 24 extends below the washer 14 when the washer is flush against the anti-compression ring 19, of the fastener 12. The threaded fastener unit 10 is particularly adapted to be used in association with relatively thin metal panels such as aluminum roofing or siding panels or the like. Turning to FIGS. 1-4, the fastener unit 10 of the invention is shown in various stages of its preferred application for securing an upper aluminum panel 34 to a lower aluminum panel 36.

As shown in FIG. 1, in the first stage of operation, the drill point 22 penetrates panels 34 and 36. The fastener is then driven through the workpiece and the tapered thread convolutions 29 on the screw form complementary threads and backward and forward thread extrusions 37, 38, 39 and 41 in the workpieces 34 and 36 as shown in FIGS. 2, 3 and 4. The thread extrusions in both the panels 34 and 36 define crests 40 and roots 42, as shown best in FIGS. 3 and 4.

The crest 32 diameter of the threaded shank 26 is greater than the internal diameter of the washer 14 for retaining the washer 14 in relationship with fastener 12.

The roots 30 and crests 32 of the fastener 12 mate with the crests 40 and roots 42 of workpieces 34 and 36 so that there is substantially 100% thread engagement between the fastener 12 and the panels 34 and 36.

It is to be noted that the shoulder 28 has a diameter greater than the root 30 diameter, but less than the crest 32 diameter. As shown best in FIG. 4, when the threaded fastener 12 is tightened, the annular shoulder 28 will be brought into engagement with the backward extruded material 37 or uppermost extruded crest 40 of the upper panel 34 which projects into the recess portion 33 of the washer 14 and the annular shoulder 28 will deform the aluminum material of the upper panel 34 and cause it to be pressed into aggressive engagement with the screw threads of the fastener. This action effectively resists loosening or retrograde rotation of screw threads from the aluminum panels 34 and 36, thereby forming a tight seal between the fastener unit 10 and the panels 34 and 36.

While a particular embodiment of the invention has been shown and described, it will be obvious to those skilled in the art that changes and modifications of the present invention, in its various aspects, may be made without departing from the invention in its broader aspects. As such, the scope of the invention should not be limited by the particular embodiment and specific construction herein but should be defined by the appended claims and equivalents thereof.

The invention is claimed as follows:

1. A preassembled threaded fastener unit for use in association with a thin metal panel comprising a fastener having a head with a clamping surface thereunder, a shank, a point and a one-piece washer; said shank including an upper unthreaded shank portion and a lower threaded shank portion and having an annular shoulder located a predetermined axial distance below the head of the fastener; said upper unthreaded shank portion having a uniform diameter between said clamping surface and said annular shoulder; said lower threaded shank portion having a plurality of helical thread convolutions having predetermined root and crest diameters; said washer having an inner diameter less than said crest diameter for holding the washer in assembled relationship with the fastener; said washer including an annular recess in a lower side thereof and the axial extent of said upper unthreaded shank portion being greater than the thickness of the material comprising said washer, and the combined axial extent of said thickness of the material comprising said washer and the axial extent of said recess being greater than said axial extent of said upper unthreaded shank portion; and said shoulder having a diameter greater than said root and less than said crest diameter for engaging and deforming a panel into aggressive engagement with said upper unthreaded shank portion of the fastener for resisting retrograde rotation of the fastener when the fastener is fully assembled with the panel.

2. A threaded fastener unit of claim 1 wherein said shank includes a drill tip portion, and certain of said thread convolutions adjacent said drill tip portion being tapered for progressively extruding material axially and forming complementary threads in a panel when the fastener is driven through the panel.

3. A threaded fastener unit for use in association with thin metal upper and lower workpieces comprising a preassembled fastener and one-piece washer; said fastener having a head with a clamping surface thereunder, a shank and a drill point; said shank including an upper unthreaded shank portion, a lower threaded shank portion and having an annular shoulder located a predetermined axial distance below said clamping surface and between said upper unthreaded shank portion and lower threaded shank portion; said upper unthreaded shank portion having a uniform diameter bvetween said clamping surface and said annular shoulder; said washer having an inner diameter greater than the diameter of said unthreaded shank portion and less than the diameter of said threaded shank portion so that the washer is retained on said shank; said lower threaded shank portion including a plurality of helical thread convolutions forming spaced roots and crests, said thread convolutions including tapering complementary thread extruding and forming portions adjacent said drill tip for extruding material forwardly and backwardly from a panel and forming complementary threads therein when the fastener is driven through said panel; said upper unthreaded shank portion having an axial extent greater than the thickness of the material comprising said washer, said washer having a central recess in a lower side thereof, the combined axial extent of said thickness of the material comprising said washer and the axial extent of said recess being greater than said axial extent of said upper unthreaded shank portion, said annular shoulder having a diameter greater than said root and less than said crest diameter for engaging with and partially displacing the uppermost thread extrusion in said panel when the fastener is fully applied for resisting retrograde rotation of the fastener.

* * * * *